United States Patent [19]

Regensburger

[11] Patent Number: 4,480,951
[45] Date of Patent: * Nov. 6, 1984

[54] SELF-DRILLING SCREW

[75] Inventor: Werner Regensburger, Widnau, Switzerland

[73] Assignee: SFS Stadler AG, Heerbrugg, Switzerland

[*] Notice: The portion of the term of this patent subsequent to Mar. 24, 1998 has been disclaimed.

[21] Appl. No.: 304,624

[22] Filed: Sep. 22, 1981

[30] Foreign Application Priority Data

Sep. 30, 1980 [AT] Austria ................................ 4887/80

[51] Int. Cl.³ ............................................. F16B 25/00
[52] U.S. Cl. .................................... 408/224; 408/213; 408/228; 411/387
[58] Field of Search ............... 408/200, 211, 213, 223, 408/224, 227, 228; 411/386, 387

[56] References Cited

U.S. PATENT DOCUMENTS

| | | | |
|---|---|---|---|
| 2,621,548 | 12/1952 | Williams | 408/233 |
| 2,732,869 | 1/1956 | Stearns | 408/224 |
| 3,699,841 | 10/1972 | Lanius, Jr. | 411/387 |
| 3,869,219 | 3/1975 | Wilson et al. | 408/224 |
| 3,916,757 | 11/1975 | Wilson | 411/386 |
| 3,997,279 | 12/1976 | Porter | 408/211 |
| 4,028,987 | 6/1977 | Wilson | 408/224 |
| 4,257,307 | 3/1981 | Regensburger | 408/228 |
| 4,347,027 | 8/1982 | Brindle | 411/387 |

FOREIGN PATENT DOCUMENTS 2801962 7/1978 Fed. Rep. of Germany ...... 411/387

Primary Examiner—Z. R. Bilinsky
Assistant Examiner—Daniel Howell
Attorney, Agent, or Firm—Toren, McGeady and Stanger

[57] ABSTRACT

A self-drilling screw includes an axially extending screw shank with a leading end and a trailing end. A drill bit is secured to and extends axially outwardly from the leading end of the screw shank. At least one wing extends laterally outwardly from the drill bit transversely of the axial direction of the screw shank and spaced from the cutting edge at the leading end of the drill bit. The wing has a cutting edge facing toward the leading end of the drill bit. The wing extends outwardly beyond the outside diameter of the screw shank and forms an enlarged bore through which the shank can pass without contact with the surface of the larger bore. Each wing has a break-off groove or notch so that it can separate from the drill bit.

18 Claims, 12 Drawing Figures

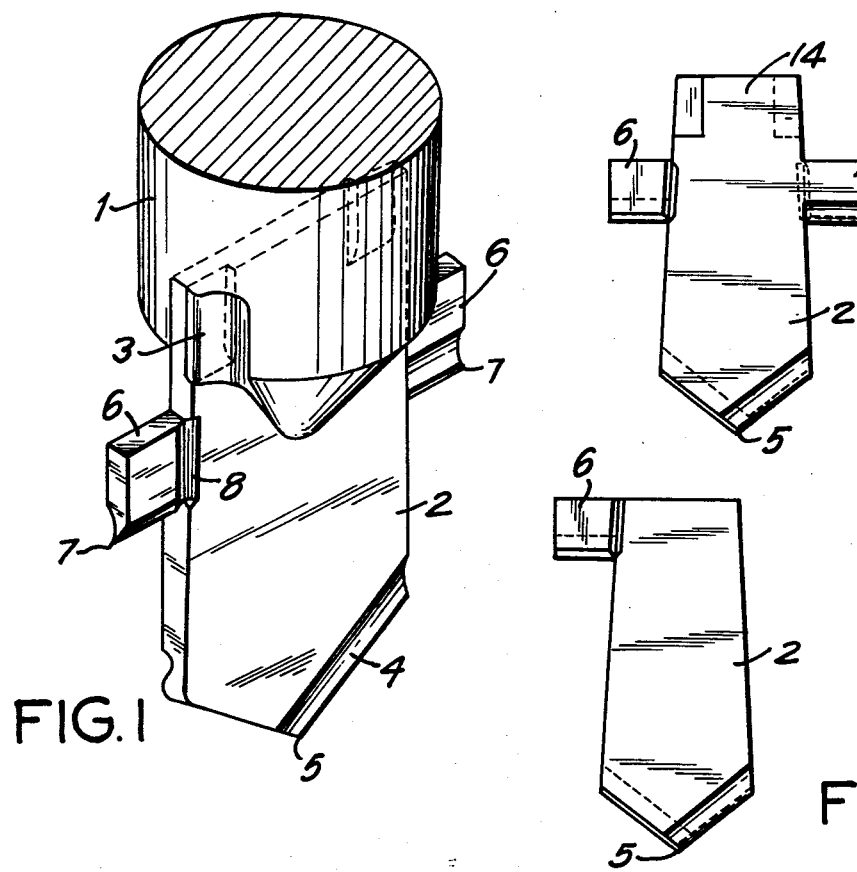
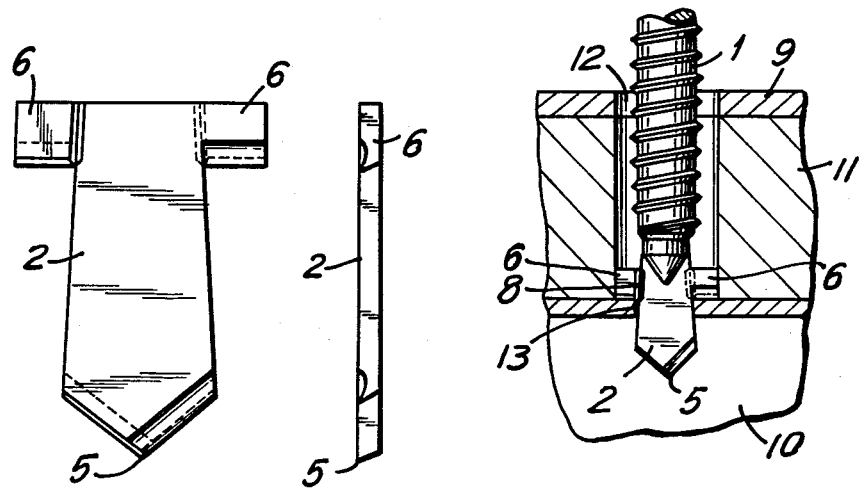

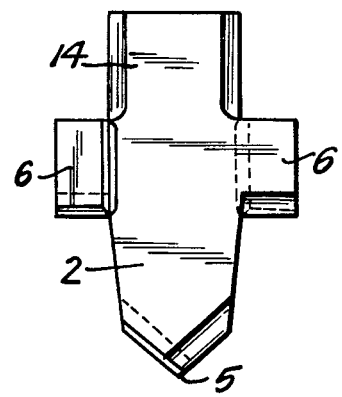
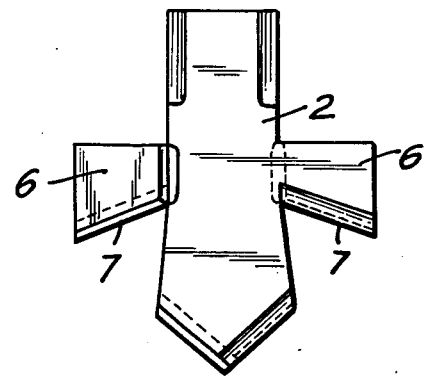
FIG. 6   FIG. 7
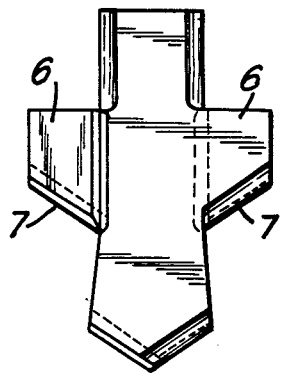
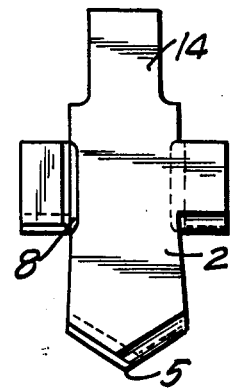
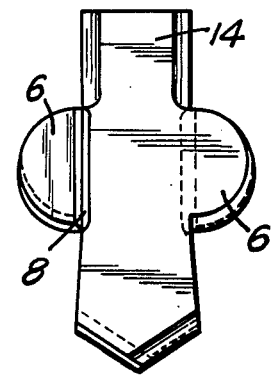
FIG. 8   FIG. 10   FIG. 11
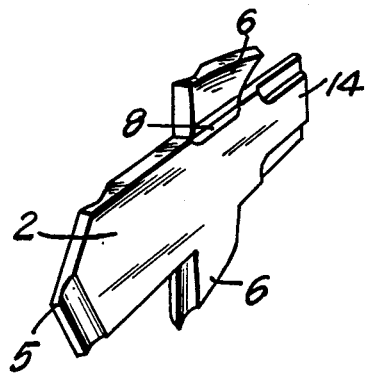
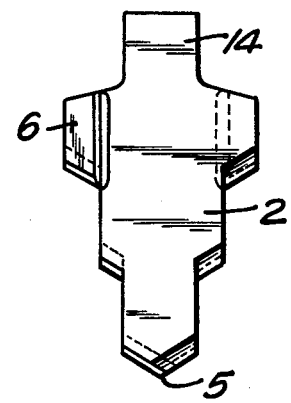
FIG. 9   FIG. 12

SELF-DRILLING SCREW

SUMMARY OF THE INVENTION

The present invention is directed to a self-drilling screw with a drill bit secured to the leading end of the screw shank. The drill bit is formed of a drill steel or a hard metal.

Self-drilling screws are known. It is possible to form the screw, that is the screw head and screw shank on which the thread is formed of a rustproof material. The drill bit, however, which cuts the bore into which the screw is secured, can be formed of an appropriately hard drill steel or hard metal and it does not need to be rustproof.

Further, self-drilling screws are known with the screw shank and drill bit formed monolithically of the same material and with wings or projections extending laterally outwardly for enlarging the size of the bore cut by the drill bit. Preferably, the wings cut an enlarged bore in a suitably soft material. Such screws are used to form an enlarged bore in an outer plate and possibly in an intermediate plate or insulation layer outwardly of the bore into which the screw is to be secured. The threads on the self-drilling screw can then pass through the enlarged bore without contact with its surface, into the bore cut by the drill bit. With the enlarged bore having a larger diameter than the screw thread, the threads are not affected when the screw is engaged within the bore cut by the drill bit. When the wings or projections reach the harder section into which the thread of the screw to be engaged, the wings break off so that the following threaded screw shank can cut into the surfaces of the bore formed by the drill bit. In such self-drilling screws, a serious disadvantage is that the drill bit is manufactured of case-hardened steel and certain milling work must be performed in the formation of the drill bit. Further, several machining operations are necessary on the screw to form the wings or projections. Moreover, other difficulties involve the formation of the projections or wings with predetermined breaking sections, since in a screw body of circular cross-section it is difficult to form such predetermined breaking sections.

Another problem faced in using such self-drilling screws is that it is difficult to provide screws which can be used under varying conditions, because the screws are formed utilizing rigid milling machine settings in the various working steps in forming the wings or projections.

It has been found in the formation of the wings or projections formed on or pressed onto the shank portion of the screw that, in addition to having a poor cutting edge shape, the outside diameter of the wings is insufficient for removing the borings from the enlarged bore. Clearly, wings of a sufficient dimension transversely of the axis of the screw body are difficult to form, since they tend to weaken the cross-section of the screw body to a point where the strength of the screw is very considerably reduced.

Therefore, it is the primary object of the present invention to provide a self-drilling screw which can be adapted to different conditions of use with the wings or projections being formed without causing any weakening of the cross-section of the screw body.

In accordance with the present invention, one or more wings or projections are formed on the drill bit spaced in the axial direction of the screw from the cutting edge of the bit with the wings being cantilevered outwardly from the drill bit transversely of the screw axis. The leading edge of the wings, that is the edge facing toward the cutting edge of the drill bit is also formed as a cutting edge.

The wing or wings are formed independently of the screw shank so that they do not cause any reduction in the cross-sectional strength of the screw. The drill bit for such a screw can be formed of high-tensile high-speed steels so that the screws can be used where it is necessary to drill into high strength steel. Wings on conventional screws formed of case hardened steel cannot be used for such a purpose.

In accordance with the present invention, it is possible to attach a drill bit with such wings on screws formed of a variety of materials. Therefore, drill bits with such wings can be used with screws made of aluminum, non-ferrous metal, steel, stainless steel, and plastics materials. The angle and shape of the cutting edges on the wings can be selected in accordance with the type of material to be drilled. The structure of the cantilevered wings can be selected as desired, because this factor no longer reduces the strength of the cross-section of the screw shank. Therefore, an optimum drilled opening for removing borings can be created in any soft layers covering the material into which the screw is to be secured. Such soft layers can include wood, plastics materials, aluminum and the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a perspective view of a portion of the leading end of a self-drilling screw with an attached drill bit;

FIG. 2 is a view showing the screw of FIG. 1 on a reduced scale with the self-drilling screw cutting into a target material;

FIG. 3 is an elevational view of the drill bit shown in FIGS. 1 and 2; and

FIGS. 4–13 are views of various embodiments of the drill bit incorporating the present invention which bits can be inserted into a screw shank.

DETAIL DESCRIPTION OF THE INVENTION

In the embodiment of the self-drilling screw illustrated in FIG. 1, the screw shank 1 has a thread, note FIG. 2, which is of a self-cutting construction, that is, it cuts its own complementary thread in the material into which it is secured. The screw shank has a leading end, the lower end as viewed in FIGS. 1 and 2, and a trailing end, that is the opposite end of the shank not shown in these figures. At its leading end, the screw shank 1 has a slot into which a plate-shaped drill bit 2 is inserted. By appropriately shaping the trailing end of the drill bit and the slot in the shank into which it is inserted, such as by projections 3 in the slot and complementary shaped pockets in the bit, a form-locking connection is produced between the trailing end of the drill bit 2 and the leading end of the screw shank 1. The leading end or edge of the drill bit 2 has a cutting edge 4. The screw shank 1 and the head of the screw located at its trailing end can be formed of stainless steel, of other metals, or of plastics material. The drill bit 2 is made of a drill steel or hard metal so that the screw can be drilled even into high strength steels.

In accordance with the present invention, spaced rearwardly from the leading end of the drill bit 2, two projections or wings 6 extend laterally outwardly. The plate-shaped drill bit 2 has a pair of relatively wide face surfaces and a pair of relatively narrow edge surfaces and the wings project outwardly from the edge surfaces in opposite directions and transversely of the screw axis. The leading edges of the wings which face toward the leading end of the drill bit are formed as cutting edges. The drill bit 2 has an arrowhead shaped leading end with a drill tip 5. The drill tip 5 is located on the extension of the axis of the screw shank 1.

In the embodiment illustrated in FIGS. 1, 2 and 3 the wings 6 extend transversely outwardly in the plane of the face surfaces of the plate-shaped drill bit. With the wings located in the same plane as the body of the drill bit, the production of the entire drill bit is made very simple. The drill bit along with the wings 6 form a so-called drill plate which can be manufactured in one operation as a mass produced part. The machining of the drill bit with separate formation of the wings, as is effected in known self-drilling screws, is not required. As a result, a significantly more economical and consequently less expensive production of the entire self-drilling screw is possible. The drill bit 2 can be punched out of a section of sheet metal of uniform thickness. It is also possible, however, to provide a drill bit increasing in thickness from the tip 5 of its leading edge to the screw shank 1 at least in the portion outside of the slot in the end of the screw shank. Within the slot in the screw shank 1, the drill bit can have its face surfaces tapering toward one another to its trailing end or the face surfaces can be parallel to one another.

As can be seen in FIG. 1, where the wings 6 are connected to the drill bit 2, a predetermined breaking notch or groove 8 is provided extending approximately parallel to the axis of the screw. By the appropriate formation of the predetermined breaking groove 8, based on the intended use of the screw, it is possible to assure that the wings 6 break off immediately upon contacting the hard material section of the support in which the screw is being inserted. Accordingly, the predetermined breaking moments for the wings 6 on the drill bit 2 can be determined by the selection of a predetermined breaking notch or groove 8 which can be formed very simply and accurately.

In the known self-drilling screws formed with drilling wings no predetermined breaking sections have been provided so that there is never a clean break of the wings from the screw shank. An uneven broken edge can cause difficulties when the thread is supposed to cut its own groove, because the protruding broken edges are located at the surface of the hole in which the bore is being drilled.

As can be noted in FIG. 1, the leading edges of the wings are undercut and form a cutting edge 7. These undercuts can be easily produced in one punching operation during the manufacture of the drill bit 2. Such a formation is excluded, for all practical purposes, when the wings are formed from the screw shank 1.

In FIG. 2 there is an example of the manner in which the self-drilling and self-threading screw of FIG. 1 is used. The screw is to be secured into a steel support 10 covered by a sheet 9 of light metal with a layer 11 of insulation between the sheet 9 and the support 10. Initially, the leading end of the drill bit 2 including the tip 5 and the cutting edge 4 cuts or drills through the cover 9 until the cutting edges 7 of the wings 6 contact the cover. The bore formed through the cover 9 and the layer 11 is increased to the outside diameter of the wings 6. Therefore, as can be seen in FIG. 2, the threaded part of screw shank 1 can pass through the bore or opening 12 formed by the combination of the drill bit 2 and its wings 6 so that the threads on the screw shank do not contact the surface of the bore 12. During the continuance of the drilling operation, the leading end of the drill bit 2 starts to penetrate into the support 10 until the leading ends of the wings 6 contact the surface of the support. With continued drilling, the torque acting on the wings, because of the increased strength of the support 10 as compared to the cover 9 and layer 11, causes the wings to break off at the breaking grooves 8. Because of the formation of the grooves 8 along the edge faces of the drill bit 2 a clean, even breaking surface is produces so that there are no protruding parts contacting the rim of the opening 13. With the wings broken off, the self-drilling screw continues to cut its way into the support 10 until the threaded portion of the screw shank 1 reaches into the opening 13 so that the screw can be securely attached to the support.

If necessary, the drill bit 2 can be removed after the necessary depth of the bore has been reached, particularly if the drill bit is likely to cause injury if it is not removed. Such a possibility does not exist in the known self-drilling screws with additional drilling wings.

As can be seen in FIG. 3, the wings 6 extend laterally outwardly from the edge faces of the drill bit 2 immediately adjacent to the section 14 of the bit which is inserted into the leading end of the screw shank 1. Such an arrangement is advantageous with regard to the attachment of the drill bit into the screw shank 1. In the embodiment illustrated in FIGS. 4 and 5 where a front view and a side view is provided of the drill bit 2, the wings are located on the trailing end of the drill bit, that is, the end secured to the screw shank.

In the embodiment displayed in FIG. 6, not only does the leading edge of the bit taper rearwardly from the tip 5 but the edge faces taper outwardly away from one another to the location of the leading ends of the wings 6. This embodiment is particularly advantageous for fastening the screw in sheet metal.

While in the embodiment shown in FIG. 6 the cutting edges of the wings 6 extend approximately perpendicularly to the axis of the screw shank, in FIG. 7 the cutting edges 7 flare outwardly and forwardly toward the leading end of the drill bit 2 forming an acute angle with the axis of the screw. As a result, a negative angle is formed by the cutting edges 7 with the axis of the screw so that the outer ends of the wings hook into the hard material and break off due to torsion as the drill bit is turned. Further, in FIG. 7, the edge faces of the drill bit 2 taper inwardly toward one another from the leading edge of the bit to the leading edges of the wing 6.

In the embodiment exhibited in FIG. 8, the cutting edges 7 of the wings flare rearwardly away from the leading end of the bit so that they form an obtuse angle with the axis of the screw. In this arrangement it is possible to avoid that the wings 6 hook into the less hard material which is particularly advantageous when that material is made up of corrugated asbestos sections.

In the embodiment shown in FIG. 9, the wings 6 extending out of opposite edge faces of the drill bit 2 are turned or bent out of the plane of the face surfaces of the bit so that the removal of borings is more advantageously accomplished. A negative rake angle can be effected by turning the wings in the direction opposite to the direction of rotation and this is especially advantageous when drilling in asbestos cement because it is possible to avoid hooking of the wings. It is also possible in such an arrangement to position the leading ends of the wings at an acute angle to a plane through the screw axis and such an arrangement may be advantageous in certain materials to be drilled. Moreover, such embodiments are easy to manufacture because the bending or turning of the wings 6 can be performed in one punching operation.

In the embodiment of FIG. 10 the predetermined breaking grooves 8 are located within the outline of the drill bit 2 which results in the formation of no outwardly projecting parts after the wings are broken off. Further, in this embodiment the section at the trailing end of the drill bit 2 which fits into the screw shank 1 is somewhat narrower so that the slot in the screw shank at its leading end can be practically closed to assure that the drill bit is adequately held.

In the embodiment set forth in FIG. 11, the wings 6 have a special shape, that is, they are semi-circular. This wing shape is particularly suitable for drilling brittle materials, such as asbestos cement, hardened foam and the like. When such materials are encountered, a semi-circular wing construction with a "blunt" cutting edge is advantageous.

It is possible, within the scope of the invention, to provide the wings 6 in a rhomboidal or triangular shape in addition to the rectangular and trapezoidal shapes shown in the drawing.

In the embodiment illustrated in FIG. 12, a pair of wings is located toward the trailing end of the drill bit with the drill bit ahead of the wings having a step-like shape. With this construction of the drill bit 2 it is possible to carry out the drilling operation in steps. This arrangement has the advantage of quick penetration of the support section with higher cutting speeds. Such a formation of the drill bit is not possible with presently known self-drilling screws with additional drilling wings, because the milling machines required for such a configuration would be too complicated. In this embodiment it is also possible that two or more pairs of wings are provided on the drill bit 2 with the outer dimension of the wings increasing as viewed in the screwing direction. Individual steps separated from one another would then be provided.

In FIG. 13 a single wing 6 extends laterally outwardly from the trailing end of the drill bit 2, depending on the material to be drilled it may be sufficient to use only one wing 6.

In the foregoing description it has been assumed that the drill bit is plate-shaped. In accordance with the present invention, however, the drill bit may be formed by other configurations. As an example, the trailing end section of the drill bit 2 which connects to the screw shank 1 could have a circular cross-section with a peg formed on the drill bit engaged within a bore in the leading end of the screw shank 1. Furthermore, it would be possible to connect the trailing end of the drill bit 2 to the leading end of the screw shank 1 by a butt joint, such as by welding or soldering.

While specific embodiments of the invention have been shown and described in detail to illustrate the application of the inventive principles, it will be understood that the invention may be embodied otherwise without departing from such principles.

I claim:

1. Self-drilling screw comprising an axially extending cylindrically shaped screw shank having a leading end and a trailing end spaced apart in the axial direction thereof, a drill bit formed of a plate-shaped piece of material separate from that of said screw shank and secured to and extending axially outwardly from the leading end of said screw shaft, said drill bit having a leading end arranged to engage and cut the surface to be drilled and a trailing end spaced in the axial direction of said screw shank from the leading end of said drill bit and secured to the leading end of said screw shank, said drill bit having at least one wing spaced axially from the leading end thereof and extending laterally outwardly therefrom transversely of the axial direction of and projecting outwardly beyond the outside diameter of said screw shaft, and said wing having a cutting edge thereon facing toward the leading end of said drill bit and extending transversely of the axial direction of said screw shank.

2. Self-drilling screw, as set forth in claim 1, wherein said drill bit is formed of a drill steel.

3. Self-drilling screw, as set forth in claim 1, wherein said drill bit is formed of a hard metal.

4. Self-drilling screw, as set forth in claim 1, wherein said drill bit has a plate-like shape with said wings extending in the plane of the face surfaces of said plate-shaped drill bit.

5. Self-drilling screw, as set forth in claims 1 or 4, wherein the cutting edges of said wings extend at an acute angle relative to the axis of said screw shank.

6. Self-drilling screw, as set forth in claims 1 or 4, wherein each of said wings has a predetermined breaking groove therein extending generally parallel to the axis of said screw shank along a line where said wings project outwardly from said drill bit.

7. Self-drilling screw, as set forth in claim 6, wherein said predetermined breaking grooves lie within the outline of said drill bit.

8. Self-drilling screw, as set forth in claims 1 or 4, wherein the axial dimension of said wings increase in the direction extending transversely outwardly from said drill bit.

9. Self-drilling screw, as set forth in claims 1 or 4, wherein said drill bit has stepped edge faces extending between said leading end and said wings with said wings projecting outwardly from said stepped edge faces.

10. Self-drilling screw, as set forth in claims 1 or 4, wherein said wings commence at the trailing end of said drill bit and extend therefrom toward the leading end of said drill bit.

11. Self-drilling screw, as set forth in claims 1 or 4, wherein said wings are spaced from the trailing end of said drill bit and the portion of said drill bit between the trailing ends of said wings and the trailing end of said drill bit forms a section inserted into said screw shank.

12. Self-drilling screw, as set forth in claims 1 or 4, wherein the cutting edges of said wings are undercut.

13. Self-drilling screw, as set forth in claims 1 or 4, wherein said cutting edges of said wings form an acute angle with the axis of said screw shank and said cutting edges slope outwardly from said drill bit in the direction toward the leading end of said drill bit.

14. Self-drilling screw, as set forth in claims 1 or 4, wherein said cutting edges of said wings form an obtuse angle with the axis of said screw shank and said cutting edges slope outwardly from said drill bit in the direction toward the trailing end of said drill bit.

15. Self-drilling screw, as set forth in claims 1 or 4, wherein said wings are bent out of the plane of said drill bit with each said wing bent oppositely to the other.

16. Self-drilling screw, as set forth in claim 4, wherein said wings having a semi-circular shape in the plane of the face surfaces of said drill bit.

17. Self-drilling screw, as set forth in claim 4, wherein the edge faces of said plate-shaped drill bit diverge from one another in the direction from the leading end toward the trailing end of said drill bit.

18. Self-drilling screw, as set forth in claim 4, wherein the edge faces of said drill bit converge toward one another in the direction from the leading end toward the trailing end of said drill bit.

* * * * *